(Model.)

J. GARDNER.
STRAW ROPE OR BAND MAKING MACHINE.

No. 244,580. Patented July 19, 1881.

Witnesses:

Inventor:
John Gardner

UNITED STATES PATENT OFFICE.

JOHN GARDNER, OF HOOSICK, NEW YORK.

STRAW ROPE OR BAND MAKING MACHINE.

SPECIFICATION forming part of Letters Patent No. 244,580, dated July 19, 1881.

Application filed May 11, 1880. (Model.)

*To all whom it may concern:*

Be it known that I, JOHN GARDNER, a citizen of the United States, residing at Hoosick, in the county of Rensselaer and State of New York, have invented a certain new and useful Straw Rope or Band Making Machine, of which the following is a specification.

My invention relates to the making of ropes or bands of straw, and may be used by itself or in connection with a grain-reaping machine.

The object of my machine is to twist and make straw into a rope or band. My machine may be used by itself for this purpose upon the application of proper motive power thereto, or it may be attached to and used in connection with a grain-reaping machine. When properly attached to and connected with such grain-reaping machine, a small portion of the straw cut by such reaping-machine is twisted and made by my machine into a rope or band, ready to be used to bind in sheaves the grain as it is cut. For this latter purpose my machine is specially adapted, and in the description of it which follows the manner of its connection with such grain-reaping machine is set forth.

The object of my machine is accomplished by the mechanism illustrated in the accompanying drawings, in which—

Figure 1:
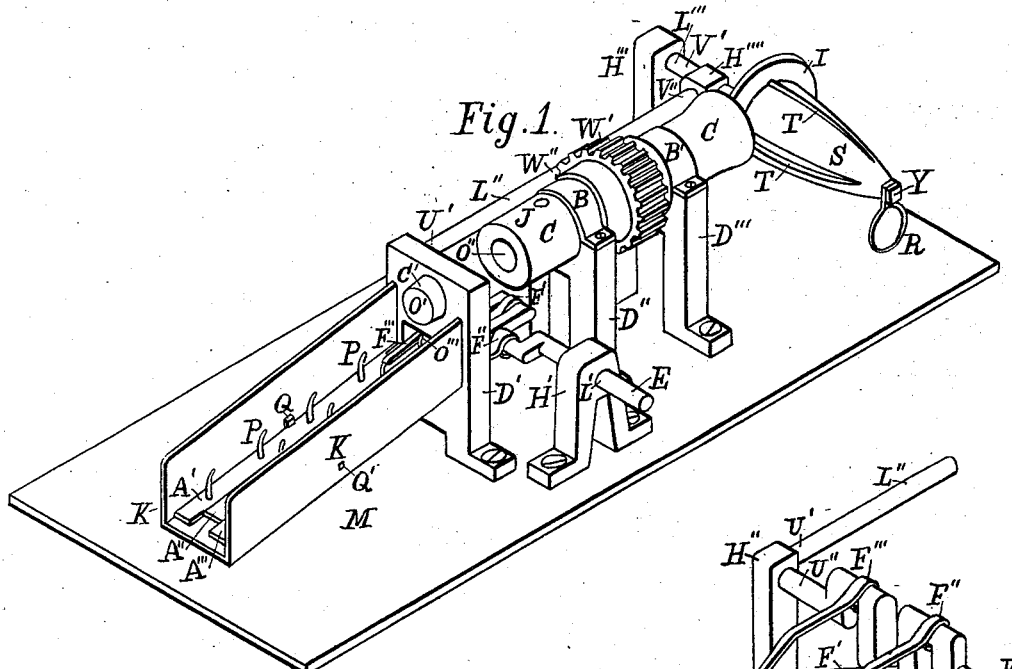
Figure 2:
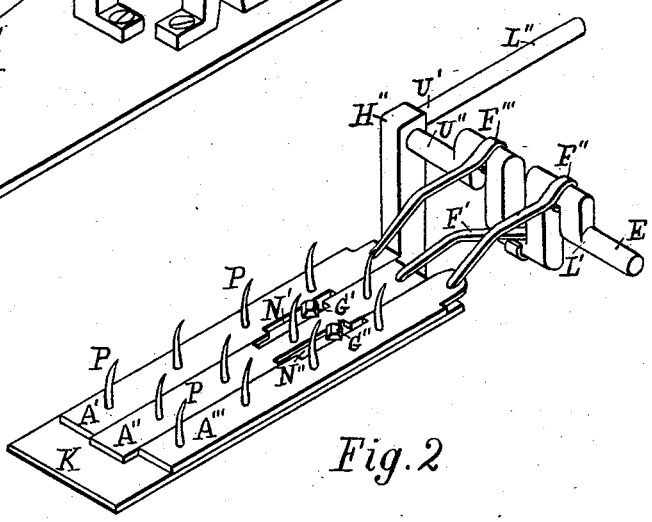
Figure 3:
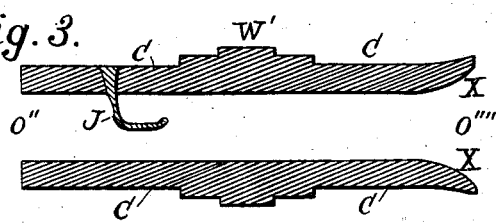

Figure 1 is a view, in perspective, of my machine. Fig. 2 is a view of the feed-trough K without its sides. Fig. 3 is a longitudinal sectional view of the twisting-cylinder C, showing the hook J in the opening therein.

Similar letters refer to similar parts throughout the several views.

M represents that part of the apron of a grain-reaping machine, or a small platform of suitable size, shape, and material, attached to such apron, upon which my machine rests, and to which it is firmly attached, as hereinafter described.

My machine consists of a feed-trough, K, of suitable size and material, open at the top and at the outer end. Said feed-trough is so arranged that the open outer end thereof is stationed upon the apron or platform M, just at the back of the cutter-bar of the reaping-machine, while the outer side of the feed-trough is about on a line with the outer end of said cutter-bar, and the feed-trough itself is at a right angle to said cutter-bar. The inner end of the feed-trough K is firmly attached to and partially closed by an upright standard or support, D', and is raised somewhat from the apron or platform M, so as to incline said feed-trough toward the open outer end of said feed-trough. The sides of the feed-trough may be perpendicular upon the outer side thereof, and on the inner side may be perpendicular to or beveled or flaring from the bottom thereof to the top. The bottom of the feed-trough is flat, smooth, and straight, and lengthwise upon it are placed three or more, if necessary or desirable, narrow, thin, and straight strips or bars, A' A'' A''', of iron or other suitable material, all of which are of the same size and length, and a little shorter than the bottom upon which they rest, and together are of the same width as the bottom of said feed-trough. The bars or strips are capable of sliding easily lengthwise of said feed-trough, upon the said bottom thereof, and are kept in position by the bolts or guides G' and G'', working in appropriate grooves N' and N'', and by the bolts or pins Q and Q', or other proper appliances.

The strips or bars A' A'' A''' are each provided with a number of small curved conical teeth or points, P, placed a little distance apart and one end thereof firmly fastened to said strips or bars in a suitable manner. These teeth or points project upwardly nearly perpendicular from the strips or bars to about one-half the height of the sides of said feed-trough, and taper from the bars or strips upward to a sharp point and are slightly curved toward the inner end of the feed-trough.

The upright standard D', which supports the inner end of the feed-trough K, is perpendicular to the apron or platform M, and its lower end rests upon and is firmly fastened thereto. This standard may be of any suitable form, size, and material, and has an opening, O''', through it, the bottom of which opening is even with the bottom of the feed-trough K, where it touches said standard, and the sides of said opening O''' are flush with the inner surface of the sides of said feed-trough and of about one-half the height of the sides of said feed-trough. This standard D' has also through it a circular opening, O', just above the said opening O'''. The center of the opening O' is intermediate the sides of the feed-trough K, and on a line with the top of the sides of the said feed-trough. Into this opening O' is tightly fitted and firmly fastened a short hollow guide-cylinder, C', of some hard metal—steel is preferable—which projects a short distance over the feed-trough K and is flush with the opposite side of the standard D'. The inner surface of this guide-cylinder C' is straight and smooth, and the outer side of the part thereof which projects beyond the said standard over the feed-trough tapers from the side of said standard to the end of said guide-cylinder, so as to form a sharp edge at the end thereof.

On the side of the standard D' opposite the feed-trough K, and at a little distance therefrom, is placed a hollow cylinder, C, of proper length and diameter, which I call the "twisting-cylinder," with the head thereof next to said standard D', and having an opening, O''', through the entire length thereof, and which opening is of the same size to nearly the tail of said cylinder, and is also of the same size and on a straight line with the opening O' in the guide-cylinder C'. This twisting-cylinder C is supported by and rotated upon two upright standards, D'' and D''', and is held in position thereon by the journal-caps B and B', which are properly fastened to their respective standards. The opening O'' in the twisting-cylinder C, near the tail of said cylinder, is enlarged outwardly, so as to be of a funnel-form, as shown at X and O'''', Fig. 3. The exterior of the cylinder C is slightly larger between the standards D'' and D''', upon which it rests, so as to form a shoulder immediately next to the inside of each such standards to prevent the cylinder from moving lengthwise. It also has attached to its exterior, between the standards D'' and D''', a cog-wheel, W', which gears into a cog-wheel upon the shaft L'' at W''. The exterior of the cylinder is also enlarged at the tail to correspond to the enlargement of the opening therein at that point.

In the opening O'' in the twisting-cylinder C, at a point just outside of the standard D'', and distant from the head of said cylinder about one-fifth of the length of said cylinder, is a hook, J, the end of the stem of which, where it enters the exterior of the cylinder, is shown in Fig. 1, and the whole of which is shown in Fig. 3. The stem of this hook is straight and passes from the outer surface of said cylinder on a slight incline toward the tail of said cylinder through the shell of said cylinder and to the center of the opening O'' therein, at which point it is bent on a curve toward the tail of said cylinder and nearly parallel to the sides of said opening O'', but with a slight curve upward and in the opposite direction to that in which said cylinder rotates, which rotation in the accompanying drawings is from right to left and toward the outer side of the apron or platform M. This hook is made from steel or other suitable material, and the part thereof which projects in the opening O'' gradually tapers from the place where it enters such opening to a blunt end, and is smooth and also round, except about midway the place where it enters the opening O'', and the center of such opening, where it is slightly thinned and flattened crosswise of said opening, so as to give it somewhat the form and properties of a spring and allow it to readily give or bend lengthwise of said cylinder and spring back to its original and proper position. That part of the stem of said hook which passes through the shell of the cylinder may be of any suitable shape, and must be securely fastened to said cylinder by some suitable means. The portion of said hook which extends along the center of the opening O'' in said cylinder, nearly parallel to the sides of such opening, is a little longer than the portion of the stem thereof between the place where it enters the opening O and the center of said opening O''.

Upon the apron or platform M, near to the tail of the twisting-cylinder C and at a right angle to said cylinder, is a cone, S. The axis of said cone S is parallel to the surface of the apron or platform M, and the upper surface of said cone, at its base, is about level with the outer edge of the interior surface of the tail of the said cylinder C. The base of the cone S is toward the outer edge of the apron or platform M and about on a line with the outer edge of the tail of said cylinder C. From the base of the cone S projects a flange, I, which may be cast or turned thereon or formed by a plate securely fastened thereto by any suitable means. The surface of the cone is smooth, and securely fastened thereto by suitable means are several bars or strips, T, of suitable material, in the form of equilateral triangles, the ends of which taper to a point. These bars or strips are placed at an equal distance from each other, with one of the sides of each thereof upon the surface of the cone and parallel to the axis thereof, with the pointed end toward the point of the cone, and extend from the flange I nearly to the point of the cone. This cone is suitably attached to a shaft, L''', which extends from the center of the base of such cone, on a line with the axis thereof, toward and nearly to the outer edge of the apron or platform M, where it has a journal, which rests and revolves upon the standard H'''. It also has another journal, which rests and revolves upon a standard, H'''', near to the base of said cone.

Projecting from the apex of said cone S, in the line of the axis thereof, is a short round bar or rod of suitable material, from which the ring R is loosely suspended by a flange projecting from one edge of said ring. The ring R is of suitable size and material, and its position is not changed by the rotation of the cone, but is capable of assuming such position as may be required by the rope or band which passes through the said ring. Upon the outer end of the bar or rod from which the ring is suspended is a suitable nut or key, Y, which keeps the flange of said ring in its position.

A horizontal shaft, L', extends from near the outer edge of the apron or platform M across the same at a right angle to the twisting-cylinder C, and about on a line with the head of said cylinder, along the rear of the apron of the reaping-machine to the inner edge of such apron, at which point said shaft is connected by proper appliances with the mechanism of the reaping-machine in such manner as to rotate the shaft L' in the requisite direction at proper speed. Upon this shaft L', at the point opposite the opening O''' in the standard D', are formed three cranks, to each of which is connected one end of one of the arms or rods F' F'' F''' in such manner as to permit the cranks to revolve in such connections and work the said arms or rods backward and forward. This shaft has suitable bearings upon the upright standards H' and H''.

Between the twisting-cylinder C and the outer edge of the apron or platform M is a horizontal shaft, L'', which is parallel to the said cylinder and extends from the shaft L' to the shaft L'''. Upon each end of the shaft L'', at U' and V'', respectively, are beveled cog-wheels which gear into corresponding cog-wheels upon the shafts L' and L'''. Also, upon the shaft L'', at W'', is a cog-wheel which gears into the cog-wheel W' on the twisting-cylinder C, and thus rotates such cylinder.

The arms or rods F' F'' F''' are connected at one end with the cranks on the shaft L', as above described, and the other end of each of said arms or rods is suitably connected with the end of one of the strips or bars A' A'' A''' nearest to said standard D', in some suitable manner, and are of any suitable size, form, and material to accomplish the purpose of working the strips or bars A' A'' A''' lengthwise in the feed-trough K. The strips or bars A' and A''' move in the same direction, while the middle bar, A'', moves in the opposite direction.

The twisting-cylinder C must rotate toward the outer edge of the apron or platform M, which, in the said drawings herein, is from right to left, and the cone S must rotate in a direction from the said twisting-cylinder C. By reversing the cone S and placing the shafts L', L'', and L''', with their gearing, upon the other side of the twisting-cylinder C, my machine may be adapted for use with either a right-hand or left-hand reaping-machine.

The operation of my machine when attached to a grain-reaping machine and in motion is as follows, to wit: a small portion of the straw cut by the reaping-machine falls lengthwise into the feed-trough K and is carried by the bars or strips A', A'', and A''', and the teeth or points P thereon to the opening O' in the guide-cylinder C', the sharp edge of the latter cutting or scraping off all above the requisite quantity, and thence into the opening O'' in the twisting-cylinder C, where it is caught by the hook J and twisted into a firm and strong rope or band, which passes out of the tail of said cylinder over the cone S, upon which it is wound, and the end thereof passing through the ring R, where it is ready for use in the usual manner for binding the sheaves.

The various parts of my machine may be of any suitable material and size for the purpose which it is intended to accomplish.

Having thus described my machine, I claim as my invention and desire to secure by Letters Patent—

1. The combination of the twisting-cylinder C with the hook J, projecting into the opening in said cylinder to the center of such opening, at a point distant from the head of said cylinder about one-fifth of the length of said cylinder, and on a slight incline toward the tail of said cylinder, and with the terminal part of said hook extending lengthwise of said opening toward the tail of said cylinder, substantially as described.

2. The guide-cylinder C', in combination with a feed-trough, K, provided with movable bars or strips A' A'' A''', having points or teeth P, and a twisting-cylinder, C, and a hook, J, as above described.

3. The cone S, having upon its surface triangular strips T, and at the apex thereof a ring, R, in combination with a twisting-cylinder, C, having a hook, J, substantially as described.

JOHN GARDNER.

Witnesses:
JNO. H. O'BRIEN,
F. P. AMETRUNO.